March 15, 1966   C. L. DU VIVIER   3,241,103
TRAFFIC ACTUATED CONTROL APPARATUS
Filed Sept. 12, 1960   4 Sheets-Sheet 1

*INVENTOR.*
CHARLES L. DU VIVIER
BY
Edward H. Eames
ATTORNEY

March 15, 1966  C. L. DU VIVIER  3,241,103
TRAFFIC ACTUATED CONTROL APPARATUS
Filed Sept. 12, 1960  4 Sheets-Sheet 2

INVENTOR.
CHARLES L. DU VIVIER
BY
Edward H. Eames
ATTORNEY

March 15, 1966 C. L. DU VIVIER 3,241,103
TRAFFIC ACTUATED CONTROL APPARATUS
Filed Sept. 12, 1960 4 Sheets-Sheet 4

INVENTOR.
CHARLES L. DU VIVIER
BY
Edward H. Eames
ATTORNEY

United States Patent Office 3,241,103
Patented Mar. 15, 1966

3,241,103
TRAFFIC ACTUATED CONTROL APPARATUS
Charles L. Du Vivier, Darien, Conn., assignor, by mesne assignments, to Laboratory for Electronics, Inc., Boston, Mass., a corporation of Delaware
Filed Sept. 12, 1960, Ser. No. 55,823
10 Claims. (Cl. 340—35)

This invention relates to traffic actuated control apparatus and more particularly to a greatly improved master controller which may be used to provide master control of a traffic actuated traffic control system of the master-local type or may be used for control of a lane changing apparatus or system in which it is desired to control or reverse the direction of flow of traffic on a lane or lanes of a multi-lane roadway according to the demands of traffic.

The use of the master controlled traffic control system in which multiple local controllers are controlled by a control device, generally referred to as a master controller, is well known in the field of traffic control. Some master controllers are relatively simple in design and function such as those employed categorically on a fixed time basis sometimes employing a simple timing device or time clock which may periodically operate one of two or more traffic plans or systems as desired. Although this type of master controller is relatively simple in design and mechanics and substantially easy to maintain, the limitation generally associated with fixed time units such as time clocks, limit this type of controller in its versatility and flexibility.

On the other hand the much more complex electronic master controllers or electromagnetic master controllers provide an extremely versatile and flexible master controller. The more massive electromagnetic or electronic equipment, in contrast to the fixed time master controller generally employing time clock means of selecting various traffic plans, may be of the traffic actuated type in which the master controller itself responds to some predetermined traffic characteristic of one or more traffic flows on one or more roadways. Although the electromagnetic and electronic type master controller has great versatility and flexibility for keeping up with the varying demands of traffic as varying conditions actually occur, the equipment required and generally included in such master controller tends to be complicated and massive as well as being expensive. Maintenance of this more complex master controller occasionally becomes a problem since highly skilled technicians are usually required to maintain and repair the master controller and the system of which it is a part. Installation and storage of such equipment provides a further problem because of the massiveness of the multiple units that make up the master controller.

Because of the high cost of procurement of such electronic and electromagnetic controllers it has been found that such types of master control equipment are generally employed in relatively large traffic control systems where a considerable number of local controllers may be controlled from one master controller.

The present invention provides a greatly improved master controller of the electronic and electromagnetic type which itself responds to the demand for traffic through actuation of the traffic itself and is less complicated and less massive than many other forms of electronic and electromagnetic master controllers. The present master controller substantially includes several components all of which are included in one relatively small package.

The preferred embodiment of the improved master controller includes two identical traffic characteristic determining components each of which may determine a traffic characteristic on one or more traffic lanes of one or more similar traffic flows with each of the traffic characteristic determining components interconnected but yet individually adjustable so that certain initial response of each component may be made according to the conditions or value of the traffic characteristic associated with the component so initially responding to such traffic characteristics and with certain other response of each component made relative to the measure or value of its associated traffic characteristic and at the same time relative to the measure or value of the other traffic characteristic measured by the other component.

The independent adjustment of each traffic characteristic determining component provides for response by one traffic characteristic determining component at certain predetermined levels of the traffic characteristic measured by the one determining component while the response of the other component may be provided at other predetermined levels of relative traffic characteristics. A timing and offset component of the master controller may be caused to respond to certain levels or values of the certain traffic characteristic determined and may also be caused to respond to higher levels of traffic characteristics with the latter response considering the relation between the two traffic characteristics determined and compared by the determining, measuring and comparing components.

Some aspects of the present disclosure are the subject of U.S. Patent 2,542,978, issued February 27, 1951, to John L. Barker for Traffic Actuated Control Apparatus or of U.S. Patent 2,932,003, issued April 5, 1960, to said John L. Barker for Electronic Cycle Computer, both having a common assignee with the present application, but the present invention relates to improvements over the aforesaid patents, as more fully set forth below.

Selection of a certain one of three timing devices may be made directly in accordance with a minimum measure or value of either one or both traffic characteristics with neither of the characteristic values being dependent upon the other value of traffic characteristic, while selection of another of the three timing devices may be made in accordance with a somewhat higher value above the minimum value of one characteristic of traffic relative to the measure or value of the other traffic characteristic measured by the other determining and measuring unit which is here considered to be part of the determining, measuring and comparing component. Associated with each one of the timing devices is a means for providing an output or combination of outputs respectively which may be extended to the local traffic controllers of a traffic control system for control of certain of the operations of the local controllers, or such output or combination of outputs may be applied to an apparatus such as a lane changing device which controls the direction of traffic flow on one or more lanes of a multi-lane roadway.

Each initiating control circuit of each timing device includes circuitry for electrically isolating the timing device itself from the initiating circuitry after the timing device has been initiated into action and also includes circuitry for providing self operating means which becomes effective just after initiation of operation of the timing device and is held effective until just prior to termination of the time period timed by such timing device, at which time electrical connection is again made between the initiating circuitry and each timing device respectively.

Associated with each timing device of the timing and offset component is a means for providing an output or combination of outputs which is the output of the master controller, for at least a minimum time as timed by the timing device then operating. The isolating circuitry associated with each of the timing devices provides for the maintenance of the output associated with the timing device then operated for at least the period of time of minimum operation of the associated timing device. At the termination of such timed period each of the timing devices is again connected to the initiated circuitry so that another of the timing devices may be selected, in lieu of the one previously operated, according to the relative condition of traffic on the roadway. Another output of the improved master controller, associated in common with each timing device, is a control lead which may extend to the individual local controller of the traffic control system for providing synchronized or coordinated control of the individual local controllers to the master controller and thus providing coordination within the traffic control system itself.

The preferred embodiment of the present improved master controller, illustrated and described in the specification herein, includes two determining, measuring and comparing components, each of which may be, in part, a simplified traffic volume computer, which, through traffic actuation may determine the volume of a traffic flow on one or more lanes of one or more roadways. Within the scope of the present application the term traffic volume is described as the number of vehicles passing a specific point on the roadway per unit time.

Another characteristic of traffic that may be determined and measured and used for measuring and comparing, in lieu of traffic volume, is traffic density. The term traffic density refers to the number of vehicles on a roadway per unit distance. If traffic density were the traffic characteristic to be measured, determined, and compared against another traffic density of another traffic flow in lieu of the traffic characteristic of traffic volume, a traffic density computer would be substituted for the traffic volume computer of the traffic characteristic determining, measuring and comparing component. Thus, two traffic density units would be included in the two traffic characteristic determining, measuring and comparing components respectively.

Another traffic characteristic that may be determined, measured and compared, one against the other, may be the average speed of traffic which may be defined as the average speed of vehicles in the traffic flow, calibrated in miles per hour.

As will be more fully described with reference to the accompanying drawings, each traffic characteristic determining, measuring and comparing component, as for example, each one of two traffic volume determining, measuring and comparing components, senses, through actuation of the vehicles in the traffic flow, the volume of the individual traffic flow being determined and measured. The output of each traffic volume measuring unit of each determining, measuring and comparing component is a direct current voltage which may vary from 0 to +100 volts representing 0 to 100 percent volume for each traffic flow, with each respective direct current voltage being proportional to the volume of traffic at its output. This output may be measured on a meter calibrated in convenient terms. Each respective direct current voltage of each traffic volume determining, and measuring unit is applied to a determining circuit individual to each respective component. The determining circuits of the respective components are individually adjustable so that individual response of each component may be made initially according to the measure or value of the traffic flow with which the respective component is directly associated. Thus, response of the individual component may be made according to a minimum value or level of traffic volume of the associated traffic flow respectively. The proportional direct current voltage of the respective components is also applied to a difference circuit within the respective component itself with each difference circuit individually providing grid control of an individual triode associated with the respective determining measuring and comparing component. The direct current voltage, which is proportional to the volume of traffic of the associated traffic flow of one volume determining and measuring unit is applied to a control means such as a triode within the network of the other traffic volume determining, measuring and comparing component so that each of the traffic volume determining, measuring and comparing components are similarly interconnected. The triode or control device of each of the respective volume determining, measuring and comparing components exerts certain control over a gating device such as the triode associated with the difference circuit of the respective component so that the triode associated with the difference circuit of one component is partially controlled, through grid control, for example, by the component by which it is a part and partially controlled, through cathode control, for example, of a control tube which is a part of the same component but the control tube being controlled by the direct current which is proportional to the volume of traffic and is an output of the other traffic volume determining and measuring unit.

Thus, individual response may be obtained by each of the traffic volume determining, measuring and comparing components when the volume of the traffic flow with which the respective component is associated is at or above a minimum value or level with a lack of response when the associated traffic volume is below such minimum value or level, directly according to the conditions of the traffic flow from which the particular volume information is being obtained. Further response may be made by either one of the two traffic volume determining, measuring and comparing components when the volume of the traffic flow peculiar to that component is at a higher level or value than the minimum value and is also at or above a certain relation with respect to the volume as determined by the other traffic volume determining and measuring unit.

Thus, it may, through the several responses, be determined when the respective traffic flows are below a minimum value or level of traffic volume, and when one volume or level of traffic or both volumes or levels of traffic are above the minimum level with one of the two values above the other relative to a predetermined relationship or when one or both values or levels of traffic are above their respective minimum values and neither traffic volume is sufficiently higher than the other, relative to a predetermined relationship.

It is therefore an object of the present invention to provide an improved, actuated master controller of the electronic and electromagnetic type, which is simplified, compact and relatively inexpensive.

A further object is to provide an improved master controller which may respond to two different traffic characteristics with two simplified and identical determining and measuring components which are individually and separately adjustable.

A still further object is to provide an improved master controller which will provide a desired response to traffic conditions on the roadway when the value of at least one traffic characteristic is above a predetermined minimum value for that particular traffic characteristic and also at least above a predetermined relation, relative to the other traffic characteristic with the predetermined value above such minimum value individually adjustable for each traffic characteristic determining and measuring unit.

An additional object is to provide an improved master controller in which selection may be made by one of three individually adjustable timing devices with each timing device associated with a particular one of three offset selections, selection of such timing device being made according to response to predetermined levels of each traffic characteristic, each predetermined relationship being individually adjustable, as desired.

Another object is to provide an improved master controller whose several components are included in one compact unit and in which such unit includes two identical traffic characteristics determining, measuring and comparing components, each component including a traffic characteristic determining and measuring unit, with each unit associated with individual level or value determining units individually adjustable and individual difference determining units with each determining unit responding to a predetermined level of its associated traffic characteristic determining and measuring unit output and the associated difference unit responding to a predetermined level of the associated output of the associated traffic characteristic determining and measuring unit together with a certain relationship between the two traffic characteristic levels or values through application of an output by the other of the two traffic characteristic determining and measuring units so as to provide dual control of the difference unit of the one traffic characteristic determining, measuring and comparing component.

Still another object is to provide an improved master controller including two traffic characteristic determining, measuring and comparing components, each of which are identical, and interconnected identically, for determining, measuring and comparing each of two traffic characteristics and for selection according to the relative value between such traffic characteristics of one of three timing devices together with one of three plans of traffic operation with the timing units and the traffic plan control units included in a timing and offset component for providing an output, or group of outputs, or combination of outputs to one or more local traffic controllers and maintaining such selected outputs or combination of outputs for at least a minimum period of time as timed by the selected timing unit during which time such output or combination of outputs may not change.

Other objects will be apparent from the following description and claims and the accompanying drawings in which:

Figure 3:
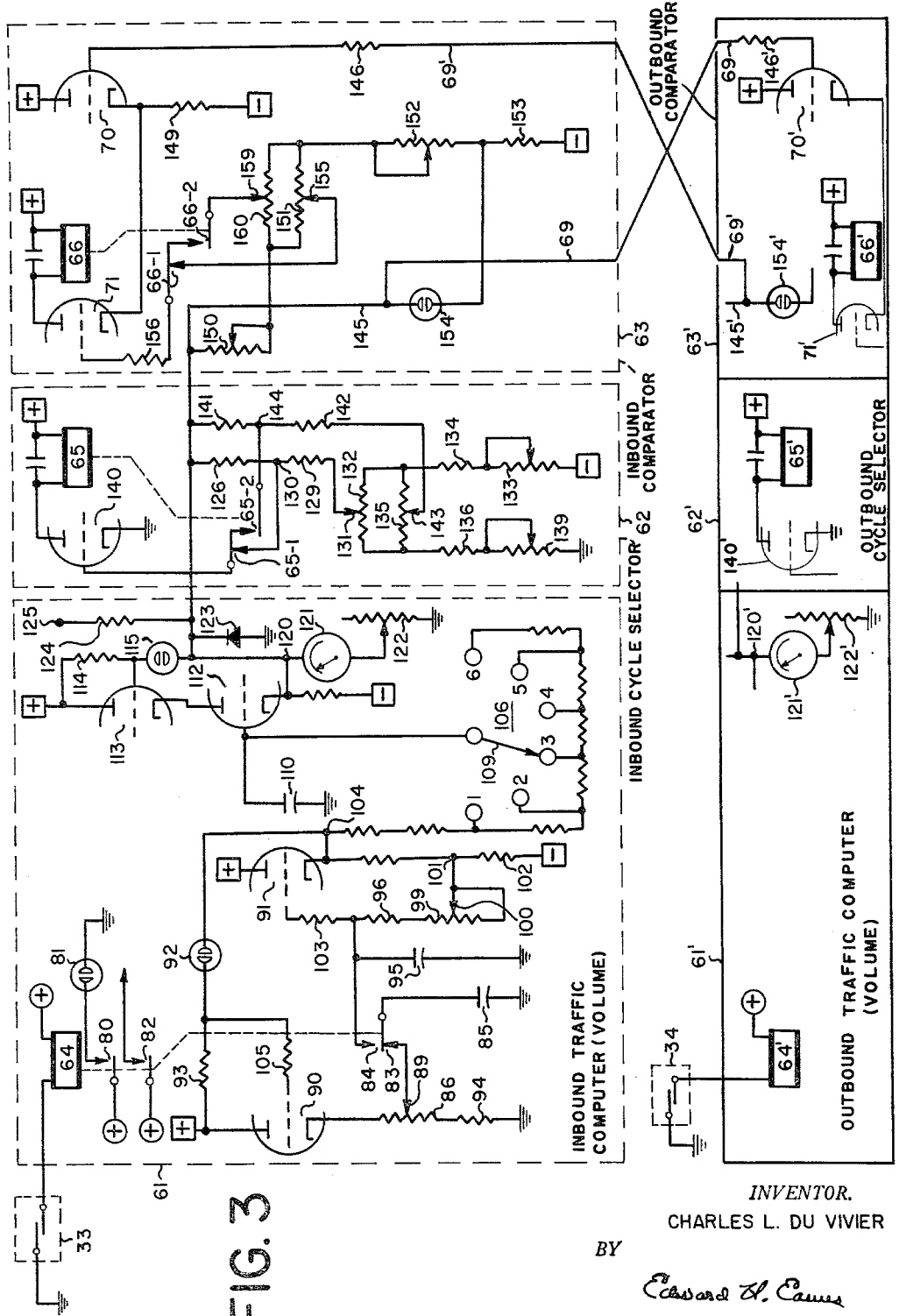
Figure 3A:
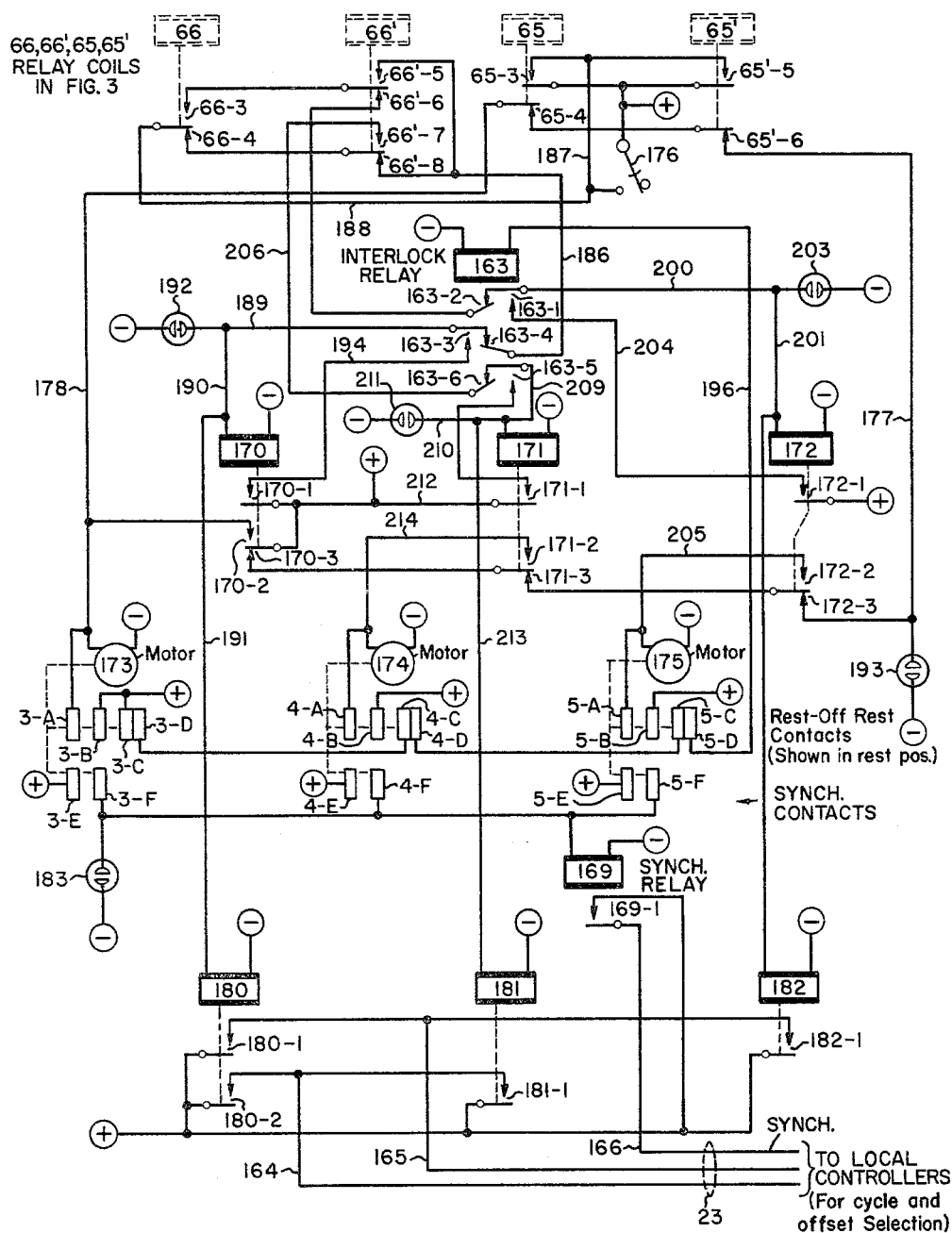
Figure 4:
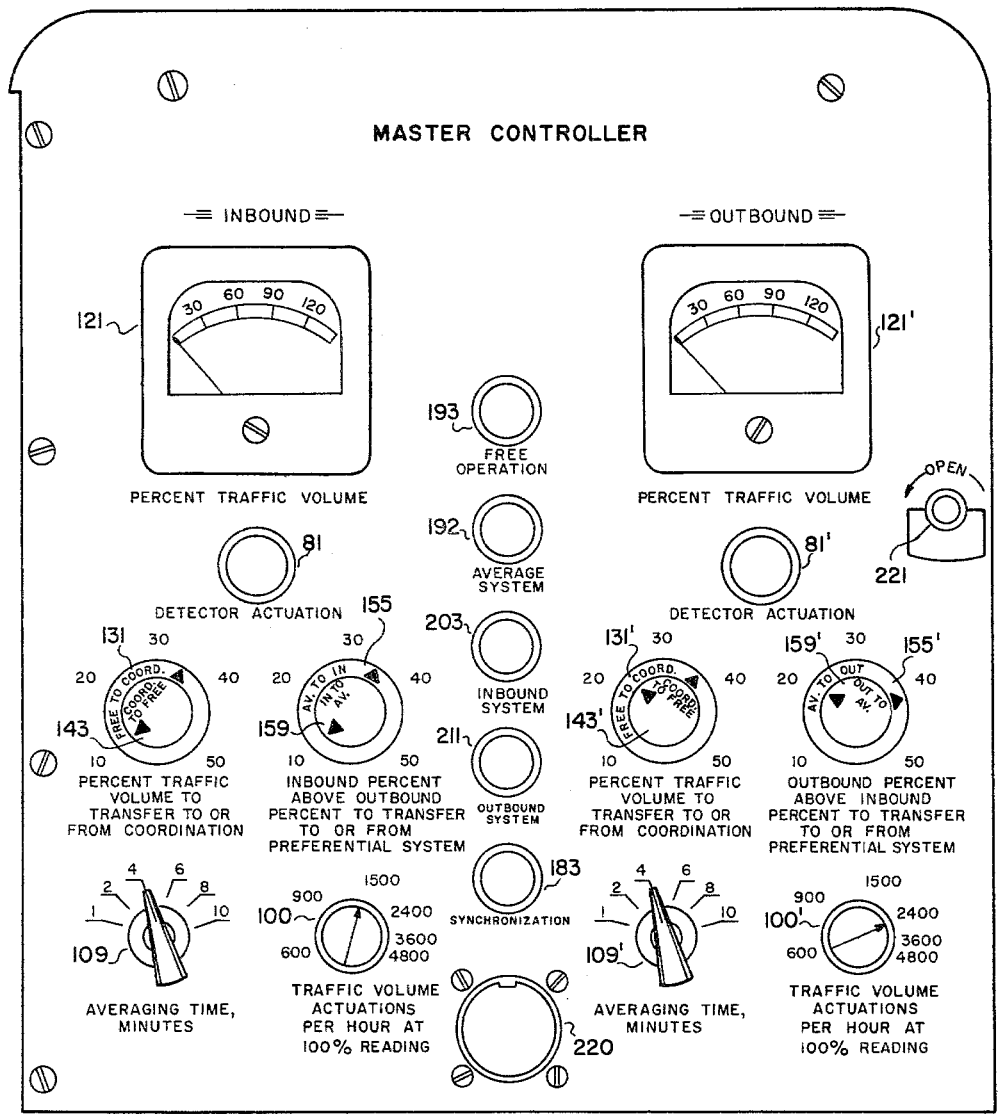

FIG. 3, including FIG. 3a, is a diagrammatic illustration, partly in block and partly in circuit form, of the preferred embodiment of a master controller; and FIG. 4 is a scale diagram, somewhat reduced, of a face panel that may be used on the preferred form of master controller.

Figure 1:
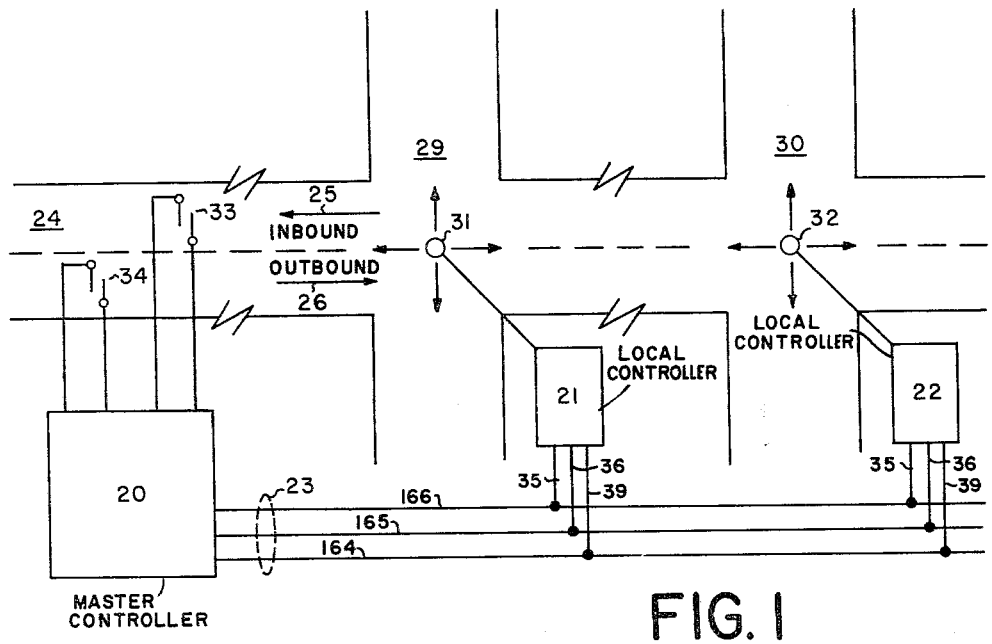
FIG. 1 is a block diagram of a plan view of a traffic control system.

Referring to FIG. 1 in more detail, a plan diagram of a traffic control system is represented, in block form, with a master controller 20 and two local traffic controllers 21 and 22 with the master controller providing output, via grouped leads 23, to the local traffic controllers 21 and 22 and also extending to other local controllers in the traffic control system.

Figure 2:
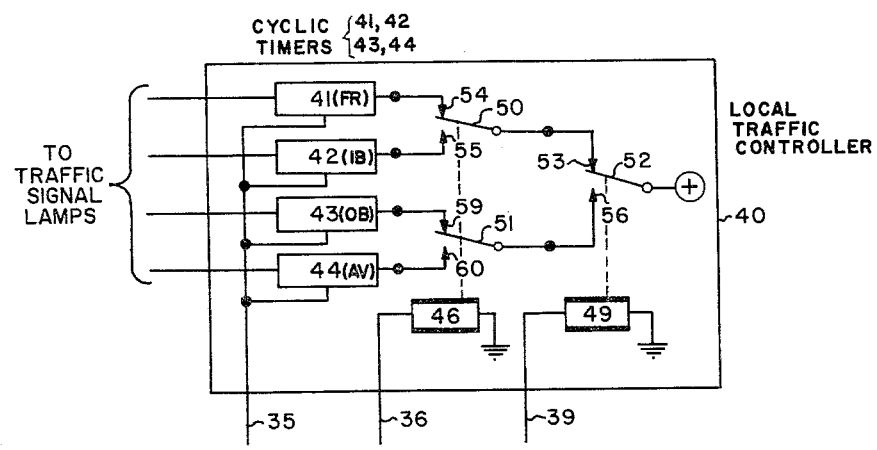
FIG. 2 is a diagrammatic view, partly in block and partly in circuit form, of one type of local controller that may respond to master control.

The master controller 20 may represent the master controller illustrated in circuit form in FIGS. 3 and 3a, or any of the alternate arrangements suggested, while one form of simplified local traffic control is illustrated, partly in block and partly in schematic form in FIG. 2.

A roadway 24, serving two-way vehicle traffic, as illustrated by arrows 25 and 26, is represented with two intersections 29 and 30. The vehicle traffic that passes through the intersections 29 and/or 30 is controlled by signal lights 31 and 32 respectively which signal lights are controlled by the local traffic controller 21 and 22 respectively so that right of way is distributed between the main roadway 24 and the cross streets that make up the intersections of 29 and 30 respectively.

A pair of open contacts 33 represents a vehicle detection device for detection, through actuation, of the vehicles traveling in the upper lane of roadway 24 while a pair of open contacts 34, represents a vehicle detection device for detection, through actuation, of the vehicles traveling in the lower lane of roadway 24.

For the purpose of identification the traffic flow, in the direction of arrow 25, in the upper lane, shall hereinafter be referred to as inbound traffic while the traffic flow, in the direction of arrow 26, in the lower lane, shall hereinafter be referred to as outbound traffic.

As will be more fully described in the description below, the inbound vehicles, traveling in the upper lane of roadway 24, will actuate the detector 33 and, according to the preferred embodiment, will cause closure of a pair of contacts to energize a detector relay associated with one component of the master controller which will consider each actuation of the inbound vehicles and determine the volume of the inbound traffic flow. The outbound vehicles, traveling in the lower lane of roadway 24, will actuate the detector 34 and will cause closure of a pair of contacts to energize a detector relay associated with another, similar component of the master controller which will consider each actuation of the outbound vehicles and determine the volume of the outbound traffic flow.

The detector devices 33 and 34 may be of the treadle type which are located in the road bed, essentially containing a pair of open contacts which are closed by passage of a wheel or wheels of a vehicle thereover or may be of any other type, well known in the art such as microwave radiant vehicle detector or any other type of vehicle detector sensitive to sound, light, heat, pressure or magnetism, for example, which will cause closure of a set of normally open contacts upon actuation by a passing vehicle.

The grouped output leads 23 of the master controller 20 may, according to one embodiment include three or more leads, for example which will each individually extend to each local traffic controller in the traffic control system. It may also be necessary to supply a common ground or return lead between the master controller and the individual local traffic controllers. This may increase the number of individual leads extending from the master controller to the local controllers but such return lead is omitted for convenience and simplification of the drawing.

In a traffic control system of the type represented, and of other similar types it is desirable to coordinate operation of the individual local controllers with a master controller and thus coordinate operation among the local controllers themselves, however, still maintaining certain of the operations of each individual local controller independent so that, for example, start of the traffic signal cycle of one local controller may be offset from the adjacent or next adjacent, or other local controller in the system so as to stagger commencement of the green or "go" signal between local controllers to provide a more uniform flow of traffic along the signalized roadway.

Along these lines, FIG. 2 is presented to represent, partly in block and partly in schematic circuit form, a simplified local traffic controller, which may represent the local traffic controllers 21 and 22 in FIG. 1. This simplified local controller is presented to illustrate one manner in which certain of the operations of a local controller may be controlled by a master controller of the type or types herein illustrated, without limitation of other manner of control of local controllers, or control by a master controller of the type or types illustrated, of apparatus to control the direction of traffic flow on a reversible lane or lanes one or more roadways such as disclosed in my copending application Serial Number 27,605, filed May 9, 1960, under the title "Traffic Actuated Control Apparatus."

The leads 35, 36 and 39 feed power to the local controllers from the group of leads 23 with each of the leads 35, 36, and 39 individually connected to one of the three leads of the group of leads 23 respectively.

The lead 35 may be referred to as a coordination or resynchronization lead since this lead, as controlled by the master controller may provide a means of keeping the local controllers in step or coordinated or synchronized with the master controller and thus in step with each other. One method of coordinated control is disclosed by John L. Barker, in his U.S. Patent 2,542,978, issued February 27, 1951, under the title "Traffic Actuated Control Apparatus." Other methods of obtaining coordinated control of local controllers by a master controller in a traffic control system are well known in the art and may be employed with efficiency to maintain coordination within the traffic control system.

The lead 35 is connected within the block 40, which represents the local traffic controller, to each of four blocks 41, 42, 43 and 44. Each of the blocks 41, 42, 43 and 44 represent individual traffic signal cycle time distributing or rotating cam timing mechanisms or printed circuit type timing devices, each of which is individually adjustable, and control the distribution of right of way, clearance, and stop time of the traffic signal cycle. Extending from each of the blocks 41 through 44 is one lead from each cyclic timing device which represents several leads, each which would extend to the traffic signal lead, such as 31 or 32 in FIG. 1, to operate the desired signal combination in the signal head, for distributing right of way between traffic flows, which signals may be of the conventional red for stop, green for go and yellow for clearance, or any other type of indicating signal or illuminated sign. It may be desirable to isolate each group of output leads from one cyclic timing mechanism to the signal head from each other and this may be done by using isolating diodes or relays, as desired. Power to operate the signal indications and the cam rotating mechanism may be applied, in part, except for the coordination control of the rotating mechanism, through a series of contacts controlled by the relays 46 and 49, the relays 49 and 46 being controlled by the master controller.

Relay 46 controls movable contacts 50 and 51 and relay 49 controls movable contact 52.

Each of the traffic signal cycle time distributing devices 41 through 44 may be individually adjusted to provide a different split or distribution of time of right of way between intersection traffic flows so that four different splits of the signal cycle are possible.

Master control of certain of the operations of the local controllers is obtained by energizing or deenergizing the output leads of the master controller to which the leads 36 and 39 are respectively connected. One lead of grouped leads 23 in FIG. 1 connects with lead 36 while another lead of grouped leads 23 connects with lead 39 so that selection of a corresponding one of the traffic signal cycle time distributing devices may be made in each of the local controllers by the master controller according to the energized or deenergized condition of the output leads feeding the leads 36 and 39, for example.

With both leads from the master controller which feed to leads 36 and 39 deenergized, the relays 46 and 49 of the local controller will be deenergized so that power, represented by a plus in a circle, will be applied to timing mechanism 41, and not to 42, 43 or 44, via normally closed contacts 52/53 and 50/54. This deenergized condition of the output leads feeding leads 36 and 39 shall be referred to as "free" operation of the local controllers and according to the preferred form of operation of the traffic control system "free" operation is "called" for by the master controller when traffic volume in both directions is below a predetermined minimum value for each direction.

With the lead from the master controller feeding lead 36 energized and the lead feeding lead 39 deenergized, the relay 46 will be energized and relay 49 will be deenergized and power will be applied to timing mechanism 42, and not to 41, 43 or 44, via normally closed contact 52/53 and through now closed contact 50/55. This combination of energized and deenergized condition of output leads by the master controller may "call" for a preferential traffic plan which may, for example give preferential treatment to inbound traffic, for example, and shall be referred to as "calling" for inbound preferential offset. According to the preferred embodiment, inbound preferential offset will be "called" for when the inbound traffic flow is above a predetermined minimum value and exceeds the value of the outbound traffic flow by a predetermined value.

With the output from the master controller energizing lead 39 and holding lead 36 deenergized the relay 49 will become energized and the relay 46 will be deenergized so that power will be applied to timing mechanism 43 and not to 41, 42 or 44 via now closed contact 52/56 and through normally closed contact 51/59. This combination of energized and deenergized condition of output leads by the master controller may "call" for a preferential traffic plan which may, for example give preferential treatment to outbound traffic, for example, and shall be referred to as "calling" for outbound preferential offset. According to the preferred embodiment, outbound preferential offset will be "called" for when the outbound traffic flow is above a predetermined minimum value and exceeds the value of the inbound traffic flow by a predetermined value.

With both leads 36 and 39 energized via the output of the master controller both relays 46 and 49 will be energized so that power will be applied to timing mechanism 44 and not to 41, 42 or 43, via now closed contacts 52/56 and 51/60. This combination of both output leads feeding leads 36 and 39 energized may "call" for an average traffic plan which may, for example provide equal treatment to both traffic flows, for example and shall be referred to as "calling" for average offset.

According to the preferred embodiment average offset will be called for when both traffic flows are above a predetermined minimum value and are substantially equal or balanced. Obviously the "call" for different offset conditions may be changed and rearranged as desired.

Referring now to FIGS. 3 and 3a, a diagram partly in schematic circuit form and partly in block form is presented, of the preferred embodiment of a master controller with the combined figures providing one form of the master controller. The master controller illustrated in the combined FIGS. 3 and 3a may be represented in FIG. 1 by the block 20. Referring particularly to FIG. 3 a series of blocks are illustrated in the lower half of the drawing and are numbered 61', 62' and 63'. The circuitry included in each of these blocks is identical to the circuitry illustrated in schematic circuit form above the respective blocks and separated in blocks of broken line form numbered 61, 62 and 63. That is, the circuitry in broken line block 61 is included in block 61' and the circuit in broken line block 62 is included in block 62' and the circuitry in broken line block 63 is included in block 63'. Certain of the relays, as for example relays 64', 65', and 66' are illustrated along with the blocks 61', 62' and 63' respectively, since the function of these relays, although similar in response to the circuit to which they are a part, as the relays 64, 65 and 66 to their respective circuits, is to serve another and separate traffic flow. Also illustrated in the block 63' is a triode which is illustrated to show the interconnection between these two component parts of the master controller.

Referring particularly to FIG. 3a the operating coils of the relays 65 and 66 and 65' and 66' are illustrated in broken line form and are merely displaced duplicates of the relay coils identically numbered in FIG. 3.

FIGS. 3 and 3a have been presented in the manner shown in order to provide a more convenient description, however it should be understood that the master controller represented in the combined figures comprises a complete unit, the component parts of which serve to provide information from at least two sources and to cooperate to provide outputs for control of one or more local traffic controllers in a traffic control system or provide outputs for control of apparatus for control of the direction of traffic flow in a lane or lanes of one or more roadways.

It should be understood that the following description of the circuit operations of the schematic circuit part of FIG. 3 also describes the circuit operations of the circuitry within the comparable blocks in the lower part of the drawing only the circuitry in circuit form will respond to one traffic flow actuation, for example, inbound traffic flow actuation while the circuitry in block form will respond to another traffic actuation, for example, outbound traffic flow actuation. The two different traffic flows could be opposite directional traffic flows on the same roadways or on different roadways or may be different traffic flows on the same roadway but in different lanes or two different traffic movements on different roadways.

For the purpose of description it shall be assumed that the traffic flows to be sensed are traffic flows traveling in different directions, on the same two way street, such as represented in FIG. 1 and referred to as an inbound traffic flow and an outbound traffic flow.

Information from inbound traffic vehicles, in the form of a voltage pulse, is obtained via closure of a pair of contacts through actuation by each inbound vehicle of a vehicle detector 33, illustrated as a pair of open contacts, which voltage pulse causes a detector relay 64 to become energized. The vehicle detector 33 in FIG. 3 may be the vehicle detector 33 in FIG. 1.

Information from outbound traffic vehicles, in the form of similar voltage pulses, is obtained via closure of a pair of contacts through actuation by each outbound vehicle of another vehicle detector 34, illustrated as a pair of open contacts, which voltage pulse causes another detector relay 64' to become energized. The vehicle detector 34 in FIG. 3 may be the vehicle detector 34 in FIG. 1.

Essentially, the preferred form of master controller, illustrated in FIGS. 3 and 3a includes two identical components, each for providing a voltage respectively which is proportional to a volume of traffic flow essentially measured and determined through actuation of the vehicle traffic in the respective traffic flow. Each traffic volume measuring component may be adjusted respectively so that a certain number of vehicles, as desired, sensed over a certain period of time, the time period also being adjustable, will represent 100% traffic volume. This number of vehicles representing 100% traffic volume is determined by the road characteristics.

A direct current voltage, which is proportional to one volume of traffic, for example inbound traffic, is applied to a meter which may be calibrated to indicate traffic volume in convenient terms. The voltage which is proportional to the volume of traffic is also applied to a determining circuit which is associated with the relay 65 and upon the volume of traffic or the proportional voltage reaching a predetermined minimum value the relay 65 is energized. Thus a volume of traffic below or above a predetermined minimum value may be determined according to the condition of the relay 65.

The voltage which is proportional to the volume of inbound traffic flow is also applied to the grid of a triode in the component associated with the outbound traffic volume while a comparable connection applies the voltage which is proportional to the volume of outbound traffic to the grid of a triode in the component associated with inbound traffic volume.

Thus the volume of inbound traffic, represented by a proportional voltage, provides partial control of the triode 70' via lead 69 by increasing or decreasing the bias on the triode 70', as the volume of inbound traffic increases or decreases, and the volume of outbound traffic, represented by a proportional voltage, provides partial control of the triode 70 via lead 69' by increasing or decreasing the bias on the triode 70 as the volume of outbound traffic, i.e., the proportional voltage, increases and decreases.

The triode 70 is connected in its cathode circuit to the cathode of the triode 71 to establish a voltage for the cathode of this tube. The grid of triode 71 is at a voltage which varies according to the voltage representing inbound traffic volume but is at a constant value below the voltage that is proportional to the volume of inbound traffic.

Thus conduction of the tube 71 is controlled via grid control by an applied voltage that is at a constant value below the voltage that is proportional to inbound volume of traffic, and via cathode control by a second triode 70 which is itself controlled via grid control by an applied voltage proportional to outbound volume of traffic. The circuit of triode 70 will be recognized as a cathode follower.

The circuit directly associated with and affecting the grid of the triode 71 and the circuit directly associated with and affecting the comparable tube in the block below the circuit drawing are both difference circuits. The difference circuit is adjustable, as desired, so that after the volume of the inbound traffic flow, i.e., the proportional voltage, exceeds the predetermined minimum value the difference circuit will cause tube 71 to conduct if the volume of the inbound traffic flow, i.e., the proportional voltage, exceeds the volume of the outbound traffic flow, i.e., the proportional voltage, by a predetermined amount or value. The predetermined amount or value over which one traffic volume must exceed the other traffic volume in order to provide conduction of one of the tubes 71 or 71' is individually adjustable, as desired.

These interconnected circuits, although individually adjustable, may provide conduction of tube 71, in the inbound traffic volume component so that when both traffic volumes are above a predetermined minimum volume and are sufficiently close so as not to exceed the predetermined difference between the two volumes, or when both traffic volumes are substantially equal, relays 66 and 66' will both be deenergized and will provide for energization of relay 66 and deenergization of relay 66' when the volume of inbound traffic is above the predetermined minimum volume and also exceeds the outbound traffic volume by at least the predetermined value, as set in the difference circuit of tube 71. Energization of relay 66' and deenergization of relay 66 is provided when the volume of outbound traffic is above a predetermined minimum volume and also exceeds the inbound traffic volume by at least the predetermined value as set in the difference circuit of the comparable tube in the lower circuit.

With both volumes below their respective predetermined minimum volumes respectively the relays 65 and 66 of the inbound traffic volume component and the relays 65' and 66' of the outbound volume component will all be in a deenergized condition.

According to the preferred embodiment with the relays 65, 66 and 65' and 66' deenergized the individual local controllers may be permitted to operate independent of each other and substantially independent of the master controller, or may be held coordinated and in "average offset" as desired, according to the position of a selector switch as described below. With either or both relays 65 and 65' energized and both relays 66 and 66' deenergized the master controller will "call" for "average offset" for the local controllers. With both relays 65 and 65' deenergized, regardless of the condition of the relays 66 and 66', the master controller will call for "free" or "average offset" for the local controllers which is selectable as desired. With relay 66 energized and relay 66' deenergized, and with either or both relays 65 and 65' energized the master controller will "call" for "inbound preferential offset" and with relay 66' energized and relay 66 deenergized, and either or both relays 65 and 65' energized the master controller will "call" for "outbound preferential offset."

The manner in which the "call" to the local controllers is accomplished is by providing for energization or de-energization, in combination of two output leads through contacts of one or another, or both of two relays in the timing and offset component, in FIG. 3a. A "call" is established by response, by the timing and offset component, to the condition of the relays 65, 66, 65' and 66' and according to the combination of conditions of such relays selection of a timing device, from three timing devices, and an output of the master control is made, the output being applied to the several local controllers in the traffic control system.

Once a "call" to the local controllers has been established, the three timing mechanisms within the master controller are electrically isolated from the determining and difference comparing circuits so that the established "call" will remain effective for at least a minimum period of time, after which the "call" may be changed, according to the relation between the traffic volumes measured and compared, all of which is more fully described below.

The preferred embodiment provides three individual output leads, which make up the grouped leads 23 represented in FIG. 1.

It should be understood that the description of the circuit operations of FIG. 3 that follows also refers to the circuitry within the blocks below numbered with prime numbers except that the detector 33 will be actuated by inbound traffic vehicles and detector 34 will be actuated by outbound traffic vehicles on different lanes of the same two way street and that the adjustable parts of the inbound traffic component may be adjusted individually and separately from the adjustable parts of the outbound traffic components.

Let it be assumed that the master controller 20 in FIG. 1 represents the master controller illustrated in the combined FIGS. 3 and 3a and that the vehicle detector represented by number 33 in FIGS. 1 and 3 is located in the upper lane of roadway 24 of FIG. 1 so as to be actuated by the individual vehicles in the inbound traffic flow and that the vehicle detector represented by number 34 in FIGS. 1 and 3 is located in the lower lane of roadway 24 of FIG. 1 so as to be actuated by the individual vehicles in the outbound traffic flow.

Accordingly each time the vehicle detector 33 is actuated its contacts are closed to complete a circuit to energize the inbound detector relay 64. Relay 64 will, upon energization close its contacts 80, which will illuminate detection indicator lamp 81, and will also close contacts 82 which may be for other counting or indicating purposes.

Energized relay 64 also opens contacts 83 and closes contacts 84. During periods between actuations of 33 relay 64 is deenergized and contacts 83 are closed. During such periods "bucket" capacitor 85 is charged with a voltage tapped off the potentiometer 86 at tap 89 in the cathode circuit of triode 90.

The plate of triode 90 is connected to a direct current (D.C.) source of approximately +300 volts, for example, represented by a plus in a square, and is normally conducting. Conduction of tube 90 is normally heavier than the conduction of triode 91 partly due to the cathode circuit of tube 91 being connected through a neon tube 92 and resistor 93 to +300 D.C., the neon tube 92 being a constant voltage drop device, and partly due to grid control of tube 91 as described below.

The voltage at tap 89 is a percentage of the voltage across the cathode to ground circuit including potentiometer 86 and resistor 94 which percentage of the total voltage is adjustable according to the position of tap 89 on potentiometer 86. The percentage of the voltage in the cathode circuit of triode 90 is applied to capacitor 85, which is returned to ground, during closure of contacts 83 which is closed when relay 64 is in a deenergized condition.

Upon actuation of detector 33 thereby causing energization of relay 64 and subsequently the opening of contacts 83 and closure of contacts 84 the charge on capacitor 85 is bucketed into "tank" capacitor 95 which capacitor is also returned to ground. The preferred embodiment provides for capacitor 95 to be substantially larger than the capacitor 85, and it has been found that the capacitor 95 may be four times larger in capacity than the capacitor 85 although other ratios may be used.

The action of charging the capacitor 85 between actuations of detector 33 and the subsequent bucketing or transfer of the charge on capacitor 85 to capacitor 95 upon actuation of the detector 33 will, upon multiple actuations, attempt to accumulate the charge on the capacitor 95 while the accumulated charge is slowly discharged through resistor 96 and part of potentiometer 99 to tap 100 to junction 101, through resistor 102 to a negative D.C. supply, of the order of −150 volts D.C., for example, represented by a minus in a square.

Adjustment of the tap 100 provides for increase or decrease of the resistance in the discharge circuit of capacitor 95 and may be used to calibrate the 100% value of volume for a desired number of vehicles. As for example 1000 vehicles per hour may be equal to 100% volume or 800 vehicles per hour may be equal to 100% volume according to the position of tap 100 on potentiometer 99.

The charge on the capacitor 95 is also applied through resistor 103 to the grid of triode 91. This provides control of the conduction of triode 91, the amount of conduction of triode 91 being proportional to the charge on capacitor 95.

The cathode circuit of tube 91 is connected through junction 104, neon tube 92 and resistor 93 to the positive 300 volt D.C. source, which holds the conduction of the tube 91 below the conduction of tube 90.

It should be noted that the junction 101 in the cathode circuit of tube 91 is maintained at slightly above ground zero and thus in absence of actuation, and the consequent absence of bucketing of charges from capacitor 85 into capacitor 95, over a substantial period of time, the capacitor 95 will substantially fully discharge through the discharge circuit described.

The voltage applied to the junction 104 may be measured by a volt meter if desired and may serve a measure of the instantaneous volume of inbound traffic.

Thus the last described circuit provides for feed back from the cathode of tube 91 through a constant voltage drop source, such as the neon tube 92, and a resistor 105 to the grid of tube 90 to provide cooperation between the tubes 90 and 91. This interconnection will provide for conduction of tube 90 at a variable rate but somewhat above conduction of tube 91 so that as the measure of volume of traffic rises, which rise is represented by the amount of voltage applied at junction 104, the tube 90 will conduct more heavily and the charge applied to capacitor 85, which is a percentage of the cathode voltage of tube 90, will increase proportionally. The increased charge on "bucket" capacitor 85 will be transferred to "tank" capacitor 95 which will become more highly charged. With a higher charge on capacitor 95 the voltage applied to the grid of tube 91 through resistor 103 will increase to cause tube 91 to conduct more heavily; however the discharge circuit for capacitor 95 may balance off the charge on the capacitor 95 against the rate of discharge with the rate of discharge varied somewhat according to the amount of charge on the capacitor 95.

With tube 91 conducting at a higher rate the voltage at junction 104 is increased thus varying the potential applied to the grid of tube 90 causing tube 90 to conduct at a still higher rate.

With substantially frequent actuations as by vehicles traveling in a relatively heavy volume of traffic flow the charge against discharge rate of capacitor 95 will balance off at a substantially high level, proportional to the volume of traffic so that the voltage at junction 104 may increase or decrease linearly proportional to the volume of traffic.

The voltage at junction 104 is applied to a calibration circuit 106 which is provided to select the volume averaging time, as desired, by adjustment of the selector switch 109. The selector switch is illustrated in the number 3 position which may average the volume, which is in the form of a D.C. voltage with 0 to +100 volts D.C. representing 0 to 100% traffic volume, over a period of time, the number 1 position being a shorter term average than position number 2 and progressively increasing the term average, up to position 6 which is the longest term average illustrated.

The long term average volume, picked off by switch 109, differing from the instantaneous volume at junction 101, is applied to a capacitor 110 and to the grid of tube 112. The tube 112 is connected via its plate circuit to the cathode of tube 113 and thus provides a cascaded cathode follower. The plate of tube 113 is connected to the +300 D.C. voltage source with its grid circuit controlled by being connected to the +300 D.C. voltage source through resistor 114 and also connected to the cathode of tube 112 through a constant voltage device, such as neon tube 115. This last described interconnection between tubes 112 and 113 sets the grid potential of tube 113, which in turn sets the plate voltage of tube 112. This essentially provides for elimination of the error apparent in any cathode follower operating over a wide voltage range, resulting from the fact that when the cathode voltage is low a relatively high negative grid voltage must be used to control the tube current, because there is a high plate voltage, as against a case in which the cathode voltage is relatively high and consequently the plate voltage is relatively low and the tube current is decreased, requiring a lower negative grid voltage.

The cathode of tube 112 is connected via resistor 116 to a −150 D.C. voltage source. The cathode voltage of tube 112 applied at junction 120 is a measure of the long term volume, the voltage being proportional to the volume of traffic having actuated the detector device 33, averaged over the period of time selected by adjustment of the selector switch 109.

The voltage applied at junction 120 is also applied to a meter 121 which may be calibrated in convenient terms to indicate the value of traffic volume. The meter is connected to ground through a potentiometer 122 which may be used for calibration purposes. A diode 123 is connected between the junction 120 and ground to prevent the cathode circuit of tube 112 from dropping below ground potential.

The potential at junction 120 is also applied through resistor 124 to terminal 125 which terminal may be connected to an external recorder or other device as desired. Certain graphic recorders may require that the terminal be first connected to an amplifier then to the recording device so that the load of the recorder will not load the circuit enough to effect the operation of tube 112.

The voltage potential at junction 120 is further applied through matched resistors 126 and 129 with junction 130 between the matched resistors. The lower end of resistor 129 is connected to a tap 131 on potentiometer 132 which potentiometer forms part of a potential divider between a −150 volt D.C. source and ground, the potential divider including potentiometer 133, resistor 134, potentiometer 132 in parallel with potentiometer 135, resistor 136 and potentiometer 139.

The tap 131 may be adjusted so as to lift the triode 140 somewhat above the −150 volt D.C. supply, that is toward ground, or zero volt and, in effect hold the grid of triode 140 less negative than the negative voltage source.

A similar adjusting circuit is provided by matched resistors 141 and 142 being connected between the potentiometer 135 via tap 143 and the cathode of tube 112 via junction 120.

The junction 130 is connected through the normally closed make-before-break contact 65–1 which is controlled by the relay 65 which is in the plate circuit of triode 140. With the cathode of the triode 140 connected to ground zero a small negative bias on the grid of triode 140 will cause the triode to conduct. By adjusting the tap 131 on the potentiometer 132 of the potential divider the potential at junction 130 may approach ground zero from a normally negative potential as the potential at junction 120 increases from approximately ground zero. In this manner conduction of the triode 140 may be controlled so as to initiate conduction of triode 140 at a predetermined potential applied to junction 120 and through resistor 126 to junction 130. When the cathode voltage of tube 112, which represents the average volume of inbound traffic, as applied through junction 120 and resistor 126 to junction 130, balances or overcomes the potential applied from the potential divider through resistor 129 to junction 130 so that the potential at junction 130 is at substantially ground zero potential or above, in a positive direction, the triode 140 will conduct and cause energization of relay 65. Thus this balancing circuit may provide for conduction of triode 140 and therefore energization of relay 65 at a certain level of volume, as desired.

Upon energization of relay 65 the contact 65–2 closes and after closing opens the contact 65–1. Thus a second balancing circuit including matched resistors 141 and 142 and tap 143 of potentiometer 135 is connected from junction 144 so that adjustment may be made to have conduction of triode 140 cease at a lower level of volume than that at which conduction had been initiated.

The potentiometers 133 and 139 of the potential divider are provided for calibration purposes so that the controlling potentiometers 132 and 135 may be calibrated and provided with dials, as shown in FIG. 9, to facilitate proper adjustment of operation of the entire unit.

The voltage potential at junction 120 is also applied, as illustrated via leads 145 and 69 and resistor 146′ to the grid of tube 70′ of the component associated with the outbound traffic flow. This lead 69 interconnects the inbound traffic volume component with the outbound traffic volume component and a comparable connection from a comparable junction 120′ in the outbound traffic volume component, which is comparable to junction 120 and lead 145 in the inbound traffic volume component, applies the potential from the comparable junction of the outbound traffic volume component through lead 145′, lead 69′ and resistor 146 to the grid of tube 70 so as to interconnect the outbound traffic volume component with the inbound traffic volume component.

The described interconnecting leads between the two components provide control of the tube 70 in the inbound traffic volume component by the outbound traffic volume component and similarly, control of the tube 70′ in the outbound traffic volume component by the inbound traffic volume component.

As may be seen in the inbound traffic volume component the plate of tube 70 is connected to the +300 volt D.C. source while the cathode of tube 70 is connected to the cathode of tube 71, both cathodes being connected in common through resistor 149 to the −150 volt D.C. source.

Thus when, for example, the outbound traffic volume increases and the potential, at junction 120′ of the outbound traffic volume component, increases proportionally to the outbound traffic volume the potential from junction 120′, applied to the grid of tube 70 of the inbound traffic component via lead 145′, lead 69′ and resistor 146 will cause increased conduction of the tube 70, the amount of conduction being proportional to the potential applied to the grid of tube 70. The cathode potential of tube 70 will be applied to the cathode of tube 71 so that in order that the tube 71 may conduct, the grid potential of tube 71 must be at least at a predetermined value relative to the potential applied to the grid of tube 70.

The grid potential of tube 71 is controlled by a difference circuit including potentiometers 150, 151 and 152 and resistor 153 connected between the potential applied to junction 120 and the −150 volt D.C. supply. Across the series connected potentiometers is a constant voltage drop source, such as neon tube 154. This parallel connected neon tube 154 is provided so that the voltage across the series connected potentiometers will remain constant while that at junction 120 varies with traffic, thus providing a circuit which may cause conduction of tube 71 at a point at which the potential of junction 120' is a given value less than 120.

The potentiometers 150 and 152 provide a calibration for the dials associated with potentiometers 151 and 160. The potential picked off at tap 155 is applied through normally closed make-before-break contact 66–1 of relay 66, through resistor 156 to the grid of tube 71.

This dual control of tube 71 is provided so that conduction of tube 71 may be provided when the potential applied from junction 120 is a predetermined amount above the value at junction 120' of the outbound traffic volume component, which is applied to the grid of the tube 70 of the inbound traffic volume component. Thus the amount of conduction through grid control by the outbound volume component of tube 70 will set the cathode voltage of tube 71 and the difference circuit of the inbound traffic volume component will set the potential on the grid of tube 71 and thus through this dual control, the tube 71 will become conductive, if the volume of inbound traffic is sufficiently above the minimum level and sufficiently above the outbound traffic volume level.

The relay 66 is illustrated connected between the plate of tube 71 and +300 D.C. source. When tube 71 is non-conducting, relay 66 is deenergized and its contacts 66–1 are closed and contacts 66–2 are open so that initiation of conduction of tube 71 may begin at the potential of tap 155 and that cessation of conduction may occur at the potential of tap 159 of potentiometer 160, the potentiometer 160 being connected in parallel with potentiometer 151.

Thus it may be seen that at a certain desired level of inbound traffic volume as represented by the voltage level at junction 120 the tube 140 may be caused to conduct and cause energization of relay 65 and at another level of traffic volume the tube 71, in cooperation with the level of outbound traffic volume, as represented by the voltage level at junction 120', may be caused to conduct and cause energization of relay 66.

Thus conduction and non-conduction of tube 140, to cause energization of relay 65, is dependent on the level of traffic volume of the inbound traffic flow so that below a minimum level of inbound traffic volume the relay 65 will remain deenergized and will become and remain energized at and above such minimum level of volume with cessation of conduction being caused at a somewhat lower level of inbound volume than initiation of conduction, while conduction and non-conduction of tube 71 depends upon the level of inbound traffic exceeding the value of outbound volume level by the required amount as determined by the difference circuit.

Therefore it may be determined by the condition of the relays 65 and 66 of the inbound traffic volume component and by the condition of the relays 65' and 66' of the outbound traffic volume component that with all relays deenergized both traffic volume levels are below the respective predetermined minimum level; with relay 65 energized and relays 66, 65' and 66' deenergized the inbound traffic volume is at or above the predetermined minimum traffic volume level and the outbound traffic volume is below its predetermined minimum level; with relay 65' energized and relays 65, 66 and 66' deenergized the outbound traffic volume is at or above its predetermined minimum traffic volume level and the inbound traffic volume is below such predetermined inbound traffic volume level; with the relays 65 and 65' energized and the relays 66 and 66' deenergized both traffic volumes are either individually at or above their respective predetermined minimum volume level but neither traffic volume is sufficiently higher than the other to provide for energization of its associated relay 66 or 66'. With the relays 65 and 65' energized or relay 65 energized and relay 65' deenergized and relay 66 energized and 66' deenergized the inbound traffic volume is at or above the minimum level and is sufficiently higher than the outbound traffic volume level to cause relay 66 to become energized. With relays 65' and 66' energized and relay 66 deenergized and relay 65 energized or deenergized the outbound traffic volume level is at or above the predetermined minimum level and is sufficiently higher than the inbound traffic volume level to cause energization of relay 66'.

Referring particularly to FIG. 3a the operating coils of relay 66, 66', 65 and 65' of FIG. 3 are represented across the top of FIG. 3a in broken line form. In addition to the contacts controlled and illustrated in FIG. 3 by the respective relay 66, 66', 65 and 65' the relay 66 of the inbound traffic volume component controls normally closed contacts 66'–4 and normally open contacts 66–3. Relay 66' of the outbound traffic volume component controls normally closed contacts 66'–6 and 66'–8 and normally open contacts 66'–5 and 66'–7. Relay 65 of the inbound traffic volume component controls normally closed contacts 65–4 and normally open contacts 65–3 while relay 65' of the outbound traffic volume component controls normally closed contacts 65'–6 and normally open contacts 65'–5.

The several relays 66, 66', 65 and 65' in FIG. 3 are illustrated as being deenergized with the normally closed contacts closed and the normally open contacts open, with the relays similarly illustrated in FIG. 3a.

The relay 163 represents a lock relay which permits a change of condition of the relays 170, 171 and 172 after at least a minimum time period as timed by the synchrolizers 173, 174 and 175.

The term "synchrolizer" is used herein for convenience to refer to an electric motor driven plural contact switching device, operating its contacts through a time cycle when initiated from a rest position, for synchronizing local controllers, as more fully described below.

The relays 180, 181 and 182 are repeater relays of 170, 171 and 172 respectively and may be used to provide different output combinations of two leads 164, and 165 with lead 166 as controlled by relay 169 contacts 169–1 and extended to the local controllers for coordination or synchronization purposes.

The output leads 164, 165 and 166 collectively may be the grouped leads 23 represented in FIG. 1, and the lead to which the leads 35, 36 and 39 of FIG. 2 are connected. The lead 35 of FIG. 2 may be connected to lead 166 of FIG. 3a while the leads 36 and 39 of FIG. 2 may be connected to leads 165 and 164 of FIG. 3a respectively.

The master controller of the combined FIGS. 3 and 3a is illustrated in a rest condition with the relays all deenergized except for lock relay 163, which is energized, and the synchrolizers 173, 174 and 175 in a rest condition, however synchrolizer 173 is illustrated energized, as explained with synchrolizers 174 and 175 deenergized.

With switch 176 being open as shown, those local controllers of the traffic control system at which it is desirable to go free may operate "free" while coordination is maintained for those local controllers not to be allowed to go free, when the relays 66, 66', 65 and 65' are all deenergized as illustrated. It may be desired to maintain coordination among the local traffic controllers and between the local traffic controllers and the master controller at all times. This may be accomplished by closing switch 176 so that when traffic conditions are so light as to permit "free" operation, coordinated control and one of the offset conditions of traffic, as for example, average offset, may be used in place of permitting "free" operation of the local traffic controllers.

The synchrolizers 173, 174 and 175 may be of the ordinary type synchrolizer, well known in the art, including a constant speed electric motor and a step down gear system so as to rotate a set of cams for opening and closing contacts, slowly, of the order of one revolution in 40 seconds, or 60 seconds or 80 seconds according to the gear ratio desired. The cam and cam contacts may be replaced by a rotary or other type printed circuit or commutator over which contact fingers are driven for providing the desired cycle time.

Synchrolizer 173 controls cam contacts 3–A, 3–B, 3–C, 3–D, 3–E and 3–F with the pairs 3–A/3–B and 3–E/3–F open at rest and the pairs 3–C/3–D closed at rest.

Synchrolizer 174 controls cam contacts 4–A, 4–B, 4–C, 4–D, 4–E and 4–F with the pairs 4–A/4–B and 4–E/4–F open at rest and the pairs 4–C/4–D closed at rest.

Sychrolizer 175 controls cam contacts 5–A, 5–B, 5–C, 5–D, 5–E and 5–F with the pairs 5–A/5–B and 5–E/5–F open at rest and the pairs 5–C/5–D closed at rest.

The speed of rotation of the cam shaft as driven by its associated motor depends upon the ratio of the gears (not illustrated) in the cam shaft driving mechanism. However the sequence of opening and closing of each of the sets of cam pairs may be similar with respect to the respective cycle time of the associated synchrolizer. As for example, upon being energized synchrolizer 173 will begin to rotate and drive its cam shaft and cause cam contacts 3–A/3–B to close while the cam pairs 3–C/3–D will open. Directly thereafter cam contacts 3–E/3–F will close. Cam contacts 3–A/3–B close a holding circuit to keep synchrolizer 173 driving while cam contacts 3–C/3–D open a circuit to cause lock relay 163 to become deenergized. Cam contacts 3–E/3–F close to complete a circuit to energize the relay 169 which relay will close its contacts 169–1 and, via lead 166 of the grouped leads 23, will provide synchronization power to keep the local controllers synchronized with the master controller and with each other. Indicator lamp 183 will also be illuminated to indicate energization at this time.

In the illustrated condition the lock relay 163 is energized, and all the synchrolizers are in their rest positions. However synchrolizer 173 is energized from positive power, represented by a plus in a circle, by a circuit through contact 170–3 of relay 170, contact 171–3 of relay 171, contact 172–3 of relay 172, lead 177, contact 65'–6, contact 65–4, lead 178, the coil of synchrolizer 173 to negative power or ground, represented by a minus in a circle. Indicator lamp 193 is also illuminated, being between negative power and contact 172–3 which is connected to power as described.

It should be understood that the synchrolizer 173 will rotate its cam shaft and close its cam contacts 3–A/3–B and open its contacts 3–C/3–D. Contacts 3–A/3–B will supply an alternate source of positive power in the event that the relays 65 or 65' should become energized and open their respective contacts 65–4 or 65'–6 while cam contacts 3–C/3–D will open to drop out lock relay 163 to electrically isolate the relays 170, 171 and 172 from the contacts and network of the relays 66, 66', 65 and 65' through make-before-break contacts of the relay 163.

Cam contacts 3–E/3–F will close after the closing and opening of cam contacts 3–A/3–B and 3–C/3–D respectively to energize relay 169. Thus for the period of the cycle timed by synchrolizer 173 the relay 169 will remain energized to hold contact 169–1 closed to supply power for synchronization, via lead 166 to the local controllers of the traffic control system.

Near the end of the timed cyclic period the cam contacts 3–E/3–F will open and the relay 169 will become deenergized and contacts 169–1 will open to deenergize lead 166. Immediately thereafter cam contacts 3–A/3–B will open and 3–C/3–D will close and the synchrolizer 173 will arrive at its rest position.

The operation of the time control and offset selection component of the master controller, in cooperation with the inbound traffic volume component and the outbound traffic component will now be described.

Let it now be assumed that for a period of time traffic in both traffic flows had been very light, so that the relays 66, 66', 65 and 65' were deenergized and that, with switch 176 open the local traffic controllers were in "free" operation and that due to an increase in inbound traffic, the volume of the inbound traffic flow increases to or above the minimum volume level as set by the determining circuit associated with tube 140 in FIG. 3 so that tube 140 becomes conducting and relay 65 becomes energized. It is also assumed that the lock relay 163 is energized and the synchrolizers 173, 174 and 175 are in their rest position.

The following description will also be similar if the relay 65' was caused to be energized instead of the relay 65 or if both relays 65 and 65' were energized at the same time. However, when relay 65 becomes energized it closes its contacts 65–3 and opens its contacts 65–4. Closure of contacts 65–3 completes a circuit to energize the relay 170, which may be referred to as the "average offset" relay, from positive power, through contacts 65–3, leads 187 and 188, contacts 66–4, contacts 66'–8, lead 186, contacts 163–4 of relay 163, lead 189, lead 190, the coil of relay 170 to ground. Repeater relay 180 is also energized, being connected to positive power applied to lead 190 via lead 191 with ground connected on the far side of its coil. Indicator lamp 192, which is connected between ground and lead 189, on which positive power is now applied is illuminated to indicate a condition of "average offset" is in effect.

Energized relay 170 will close its contacts 170–1 and 170–2 and open its contact 170–3. Contacts 170–3 open a circuit previously described through which synchrolizer 173 was energized, and at the same time extinguishes lamp 193.

Closure of contacts 170–1 prepares a holding circuit for the relay 170 from positive power through contact 170–1, lead 194, to now open contact 163–3 and lead 189, lead 190 to relay 170 to ground and via lead 191 to relay 180 to ground.

Closure of contacts 170–2 completes an energizing circuit for synchrolizer 173 supplying positive power between the positive supply through contacts 170–2, lead 195, the coil of synchrolizer 173 to ground.

Synchrolizer 173, now energized, through the last described circuit, drives its cam shaft and causes the closure of cam contacts 3–A/3–B and opens cam contacts 3–C/3–D. The closure of cam contacts 3–A/3–B provides a driving circuit for synchrolizer 173 so that the synchrolizer 173 will remain energized until it completes its entire cycle and returns to its rest or home position, even though the initiating power source may be removed during its cycle. Closure of cam contacts 3–E/3–F completes an energizing circuit for the relay 169 and provides for illumination of indicator lamp 183.

Open cam contacts 3–C/3–D cause lock relay 163 to become deenergized, its energizing circuit including a power source, cam contacts 3–C/3–D, when closed, close cam contacts 4–C/4–D and 5–C/5–D, lead 196, the coil of relay 163 and a ground return. It should be noted that similar pairs of cam contacts of each respective synchrolizer, in series connection, are included in the energizing circuit of the lock relay 163 so that the energizing circuit of relay 163 may be opened by any one of the three similar pairs of cam contacts of the respective synchrolizers.

Deenergized relay 163 releases its moving contacts and the contacts 163–2, 163–4 and 163–6 begin to open but before these contacts open the contacts 163–1, 163–3 and 163–5 close. These contacts are known in the art as make-before-break contacts and the closure of contacts 163–3 before the opening of contacts 163–4 provide an overlap between completion of the holding circuit of relay 170 and the opening of the pull-in circuit for relay 170.

Thus with the opening of the contacts 163–2, 163–4 and 163–6 the potential pull-in circuits for the relays 172, 170 and 171 respectively are broken and the holding circuit of relay 170 maintains relay 170 energized while the relays 171 and 172 remain deenergized since their respective holding contacts 171–1 and 173–1 are open.

The relay 180, which is in parallel with the relay 170 also remains energized and the relay 180 holds closed its normally open contacts 180–1 and 180–2 thus providing power to both output leads 165 and 164 respectively.

With both leads 164 and 165 of the grouped leads 23 energized the master controller "calls" for "average offset" and response may be obtained with local controllers as previously described with reference to FIG. 2, for example.

The synchrolizer 173 will now continue in its cycle and relays 170 and 180 will remain energized through its cycle regardless of the condition of the relays 66, 66', 65 and 65'. During this period of time, the time of which is determined by the gear ratio of the drive mechanism associated with the synchrolizer 173, the combination of output leads energized in grouped leads 23 may not change.

Just before the end of the cycle as symbolized by one complete revolution of the cam shaft, the cam contacts 3–E/3–F open to cause deenergization of relay 169 and therefore deenergization of output and synchronization of lead 166. Immediately thereafter the synchrolizer enters its rest position and upon arriving at its rest position the cam contacts 3–A/3–B open and cam contacts 3–C/3–D close. Relay 163 is again energized while the self-driving circuit of synchrolizer 173 is opened.

With the relay 163 energized, its make-before-break contacts reverse, so that contacts 163–2, 163–4 and 163–6 close and then its contacts 163–1, 163–3 and 163–5 open. The relays 170, 171 and 172 are now electrically connected to the source of supply through the network of contacts and circuitry controlled by the relays 66, 66', 65 and 65'. If traffic conditions on the roadway have not altered so that relays 66 and 66' at this moment remain deenergized and either or both relays 65 and 65' are energized, or remain energized, relay 170, and its repeater relay 180 will remain energized and synchrolizer 173 will remain energized and continue to rotate its cam shaft and cycle in a manner previously described.

Thus it may be seen that at the end of each cycle, as timed by the synchrolizer, the timing and offset component checks back to sense the condition of the relays which may be said to respond to the roadway traffic conditions and during the timed cycle period the timing and offset "called" for may not change until the end of such timed cycle, even though the conditions of the relays 66, 66', 65 and 65' may change during such timed cycle.

Let it now be assumed that prior to the end of this timed cycle, as timed by the synchrolizer 173, traffic conditions on the roadway change so that the volume of inbound traffic increased sufficiently above the minimum level, and the volume of outbound traffic remained substantially constant, so that the relay 66, of the inbound traffic volume determining, measuring and comparing components, was energized while the relay 66', of the outbound traffic volume determining, measuring and comparing component remained deenergized.

With the synchrolizers 173, 174 and 175 in their rest position and the relay 163 energized so as to electrically connect the relays 170, 171 and 172 through the network of the circuitry and contacts controlled by the relays 66, 66', 65 and 65' and since it is now assumed that the relays 65 and 66 are both energized, the initiating energizing circuit of the relay 170 is opened at now open contact 66–4. A circuit is now completed to energize the relay 172, the circuit being completed from positive power through contact 65–3, lead 187 and 188, now closed contact 66–3, normally closed contact 66'–6, lead 199, contact 163–2, lead 200, lead 201 to the coil of relay 172 to ground.

When the energizing circuit for the relay 170 was opened the indicator lamp 192 was also extinguished, and with the completion of the energizing circuit for the relay 172 the indicator lamp 203 is now illuminated. Energized relay 172 closes its contact 172–1 and 172–2 and opens its contact 172–3. Closure of contact 172–1 prepares for completion of a holding circuit so that when contact 163–1 is closed by deenergization of relay 163, a circuit is completed to keep relay 172 energized by positive power applied through the contact 172–1, lead 204, contact 163–1, lead 200, lead 201, the coil of relay 172 to ground. The initial energizing circuit of relay 172 also energizes the repeater relay 182 which is connected to lead 201 via lead 205 so that the positive power on lead 201 may be applied to the coil of relay 182 to ground. Closure of contact 172–2 completes a circuit to energize the synchrolizer 175 from positive power through the contact 170–3, contact 171–3 of relay 171, contact 172–2, lead 205, the motor of synchrolizer 175 to ground. The synchrolizer 175 now being energized, commences to drive its cam shaft at a relatively slow rate, the rate at which the cam shaft is being rotated being determined by the gear ratio selectable as desired. The cam shaft affects cam contacts 5–A/5–B so that these contacts close and provide an alternate energizing circuit for the synchrolizer 175 so that if the initiating energizing circuit should open before the end of the timed period the synchrolizer 175 will drive through to its rest position. The cam contacts 5–C/5–D are opened at the same time the cam contacts 5–A/5–B are closed, the former two cam contacts breaking the energizing circuit for the relay 163 so that the relay 163 becomes deenergized and reverses its contacts to electrically isolate the relays 170, 171 and 172. Immediately thereafter cam contacts 5–E/5–F close to energize the relay 169 which closes its contact 169–1 to energize synchronization line 166.

Thus with the relays 182 and 169 energized so that the contacts 182–1 and 169–1 are closed by the respective relays, positive power will be applied to the output leads 166 and 165 while the lead 164 of the grouped leads 23 will be deenergized. The lead 166 being a synchronization output lead and the lead 165 being energized cooperates with deenergized lead 164 to provide a "call" to the local controllers for a certain traffic plan which may be called "inbound preferential offset."

Near the end of its time cycle the cam shaft of the synchrolizer 175 will cause the cam contacts 5–E/5–F to open thereby deenergizing the relay 169 which will cause the opening of its contact 169–1 and the deenergization of the output lead 166 to the local controllers. Immediately after the opening of the last named cam contacts the cam contacts 5–A/5–B will open and the cam contacts 5–C/5–D will close. The synchrolizer 175 is now in its rest or home position. Closure of the contacts 5–C/5–D again completes the energizing circuit for the relay 163 which reverses its make-before-break contacts so that the relays 170, 171 and 172 are again electrically connected to the circuitry network controlled by the relays 66, 66', 65 and 65'. If at this time there is no change in the combination of conditions of the last named relays, the relay 172 will remain energized along with its repeater relay 182 and the energizing circuit for the synchrolizer 175 will remain closed and the synchrolizer 175 will repeat the last described operation and time another time cycle.

Let it now be assumed that the volume of inbound traffic has remained sufficiently above the volume of outbound traffic on the roadway so that the output leads of group 23 called for "inbound preferential offset," for the substantial period of time so that multiple cycles were made by the synchrolizer 175 and that now, during the last of these cycles, as timed by the synchrolizer 175, traffic conditions on the roadway change rapidly so that the volume of inbound traffic decreases to or below the minimum level and the volume of outbound traffic increases substantially above the minimum level and sufficiently above the inbound traffic volume level so that the relays 65' and 66' become energized by the outbound traffic volume determining, measuring and comparing component. Under the assumed conditions relay 65 may or may not be energized, according to the level of the inbound traffic volume, however, the relay 66 is deenergized.

When the synchrolizer 175 arrives in the home position of its latest cycle, as here assumed, the lock relay 163 becomes energized to electrically connect the relays 170, 171 and 172 to the circuit network controlled by the relays 66, 66', 65 and 65'. Now with the relays 66' and 65' energized the energizing circuit for the relay 172 is opened at contact 66'-6 so that the relays 172 and 182 become deenergized and the indicating lamp 203 becomes extinguished. The contact 172-1 opens to prevent any holding circuit for the relay 172 from being completed upon deenergization of the relay 163 while the contact 172-2 opens to break the energizing circuit for the synchrolizer 175.

In the preferred embodiment, there is a slight overlap in the operation of the make-before-break contacts of the relay 163, and the holding circuit for the relay 172 will still be completed when the energizing circuit for the relay 171 is completed by operation of the moving arms of the make-before-break contacts of relay 163. This slight overlap provides for combined energization of relays 172 and 171 for a very short period of time, of the order of less than .1 second for example, so that the indicator lamp 193 will not flash on and off again, which may be caused if there were no overlap in the energized conditions of both relays. The relay 171 is energized through a circuit providing positive power through contact 65'-5 lead 187, 188, contact 66-4, contact 66'-7, lead 206, contact 163-6, lead 209 to the coil of relay 171 to ground. Relay 181 the repeater relay of relay 171 is also energized when relay 171 is energized. Indicator lamp 211 is also illuminated, being connected to the energized lead 209 via lead 210. Energized relay 171 closes its contacts 171-1 and 171-2 and opens its contact 171-3. Contact 171-1 prepares a holding circuit for relay 171 so that when contact 163-5 becomes closed a circuit will be completed from positive power through lead 212, contact 171-1, contact 163-5, lead 209 to the coil of relay 171 to ground and also will supply power to keep the indicator lamp 211 illuminated and maintain repeater relay 181 which is connected to energized lead 209 via lead 213 energized. Relay 181 closes its contact 181-1 which contact supplies power to the output lead 164 of the group leads 23 so that the combination of leads 164 being energized and 165 being deenergized will "call" for the local controllers to provide a traffic plan which may be called "outbound preferential offset."

Closure of contact 171-2 provides an energizing circuit for synchrolizer 174 from positive power through the contact 170-3, contact 171-2, lead 214, the coil of synchrolizer 174 to ground. Synchrolizer 174 thus being energized, commences to rotate its cam shaft which causes closure of cam contacts 4-A/4-B and opening of cam contacts 4-C/4-D. Closure of the former pair of cam contacts provides an alternate energizing circuit for the synchrolizer 174 while closure of the latter pair of cam contacts opens the energizing circuit for the relay 163. Deenergization of relay 163 operates its make-before-break contacts so as to electrically isolate the relays 170, 171 and 172 from the network circuitry controlled by the relays 66, 66', 65 and 65'. The rotating cam shaft of synchrolizer 174 causes closure of cam contacts 4-E/4-F which complete an energizing circuit for the relay 169 which relay when energized will provide power via lead 166 of the grouped leads 23, for synchronization of the local controllers in the traffic control system.

The sequence of operation of the cam contacts of the synchrolizer as controlled by its rotating cam shaft is similar to the sequence of operation of the cam contacts associated with synchrolizer 173 and also the cam contacts associated with synchrolizer 175. However, the cycle now timed by synchrolizer 174 may be different in length from those cycles timed by either one or both of synchrolizers 173 and 175, as determined by the size of the gears in the mechanism (not shown) employed to drive the cam shaft associated with the synchrolizer. Sequentially the cam contacts 4-E/4-F will open and thereafter the cam contacts 4-A/4-B will open and 4-C/4-D will close, the latter two pairs of cam contacts being operated at the same time, this condition being the home or rest condition of the synchrolizer 174. Closure of the cam contacts 4-C/4-D completes the energizing circuit for the lock relay 163 which electrically connects the relays 170, 171 and 172 through the circuit network controlled by the relays 66, 66', 65 and 65' so that it may be determined at this time, if a change of traffic conditions has occurred on the roadway so that a change of traffic plan may be accomplished, if necessary.

Thus it has been described how one form of the present master controller, employing the traffic characteristic of traffic volume may, through the use of two traffic volume determining, measuring and comparing components determine and measure the volume of traffic of two different traffic flows and may respond to various levels of traffic volume of each respective flow and may cooperate and compare the two traffic volumes and provide response of one or the other of the determining, measuring and comparing components in response to the relation between the two traffic volumes. Responses to various traffic conditions, as determined by the volume of traffic in the respective traffic flows, has been made by energization, singularly or in combination, of several relays, although obviously other methods of response may be employed in lieu of relay response. Further it has been shown how a timing and offset component may respond to such combined condition of the responsive relays of the determining, measuring and comparing components to provide an output and combination of outputs of the master controller to the local controllers of the traffic control system.

Referring now to FIG. 4, a reduced scale view of a face panel of the present controller is presented in a form that may be employed for use on a master controller employed in a traffic control system as presented in FIG. 1, for example. If it be assumed that the two traffic flows being measured and compared are an inbound traffic flow and an outbound traffic flow and that the characteristics of such traffic flows being measured is traffic volume, the face panel presented in FIG. 4 may serve for a face panel on such master controller in the master controlled traffic control system.

On the left side of the face panel, under the term called "Inbound" are the indicating meter, the detector actuation indicator and the several knobs for the adjustments referred to in the description of the inbound traffic volume determining, measuring, and comparing component in FIG. 3. The meter 121 in FIG. 4 is comparable to the meter 121 in FIG. 3, while the detector actuation indicator 81 compares with the detector indicator lamp 81 in FIG. 3. The knobs 131, 143, 155, and 159 are employed to adjust the similarly numbered taps of their respective potentiometers in FIG. 3, while the switch 109 corresponds to the switch 109 of the calibration circuit 106 in FIG. 3 and the selector switch 100 compares with the similarly numbered tap in FIG. 3, all as shown in the blocks 61, 62, and 63.

On the right side of the panel under "Outbound" is another set of indicators and adjustment knobs of the master controller which are similar to the indicating and adjustment knobs on the left side, however, these components have a primed number and are particularly associated with the block 61', 62', and 63' of FIG. 3.

Between the two sets of indicators and adjustment knobs peculiar to the inbound traffic flow and the outbound traffic flow are a set of indicator lamps 193, 192, 203, 211, and 183 which are illustrated in FIG. 3a by similarly numbered indicator lamps. A connector 220 is illustrated on the base of the panel for external connections to input lines and output lines to and from the master controller and are particularly made by plug connections individual to each of the input and output lines respectively.

Arranged vertically along the left side of the panel and horizontally across the top are a total of 6 screwheads, which are unnumbered, which are used to mount the panel on a frame. In its preferred form, the panel is mounted on a frame which is in turn connected to a housing via a hinge on the left side so that the face plate may swing free from the housing for easy accessibility. On the right side of the face panel as indicated by the numeral 221, is a swivel locking means for holding the panel and frame closed to the housing.

The knobs 131 and 143 are dual concentric knobs for providing adjustments as indicated beneath the knobs and on the knobs themselves. Similarly the knobs 155 and 159 are dual concentric knobs providing individual adjustments as indicated. These knobs are for the adjustment for the inbound traffic volume determining, measuring, and comparing component, while the outbound traffic volume determining, measuring and comparing component has similar knobs similarly numbered with prime marks on the number. The selector switch 109 associated with the inbound traffic flow and the selector switch 109' associated with the outbound traffic flow select the period of time over which the individual volumes may be measured. The selector switch is 100 and 100' of the inbound traffic flow and the outbound traffic flow respectively are used to select the number of vehicles per hour which would be equal to 100% volume of the respective traffic flow.

The volume indicators 121 and 121' are calibrated in percentage of traffic volume and each is calibrated to 150%.

If during operation of the master controller the selector switch 100 was set as shown for 1500 for example, and the meter 121 read 100%, then this would indicate that a volume of 1500 vehicles per hour was being sensed in the inbound traffic flow, while with the same setting of switch 100 and a reading of 120%, 1800 vehicles per hour would be the traffic volume. If, on the other hand the meter 121 would read 30% then the volume of inbound traffic flow would be 450 vehicles per hour.

Although it may be preferred to adjust the switches 109 and 109' so that the respective volumes are determined over the same time period, each may be adjusted so that the two volumes are determined over different time periods.

Similarly the individual adjustments by the concentric knobs 131/143 and 131'/143' provide that different adjustments may be made, as desired, so that the individual determining, measuring and comparing components may respond respectively to different levels of their measured traffic volume, respectively.

This principle of individual adjustments is further continued within the invention as seen by the concentric knobs 155/159 and 155'/159' which may be individually adjusted so that response to the predetermined relationship of inbound volume over the outbound volume may be made at one differential between the two volumes while response to the predetermined relationship of the outbound volume over the inbound volume may be made at a different differential between the two volumes.

It should be noted that the settings of the various adjustment knobs is not representative of any one or desired setting. The setting of the various knobs may be determined by the character of the roadway or roadways on which the traffic characteristics are being sensed and also considering the traffic characteristic determined.

It should be understood that certain modifications of the master controller of this invention may be made. As for example, FIG. 1 herein illustrates a two lane roadway with one lane in each direction from which volume information is obtained. It may be desired to sense and determine the volume of traffic in a traffic flow where more than one lane is allocated to such traffic flow. Information from only one lane of several lanes allocated to the same direction of traffic may not be sufficient for determining the volume of the entire traffic flow.

If the traffic flow to be sensed and measured should use two or more lanes, vehicle detection devices or a vehicle detection device may be used in, on or under each of the lanes respectively which may duplicate the detection devices shown, for each lane and each detection device may be associated with its own detector relay, which may be a duplication of the detector relay shown, for the one traffic flow. The sets of contacts illustrated as controlled by the detector relay in FIG. 1 may be duplicated for each additional detector relay and for each additional detector relay may be an additional "bucket" capacitor, similar to the "bucket" capacitor 85, for example, and similarly connected to the tap 89 with a normally closed contact similar to contact 83 and a normally open contact similar to contact 84 controlled by the additional detector relay associated with the additional "bucket" capacitor.

Thus where two or more traffic lanes are allocated to the same directional traffic flow a detector device operating a detector relay which in turn may operate an indicating lamp, and contacts similar to contacts 83 and 84 in FIG. 1, and a "bucket" capacitor connected in circuitry similar to the circuitry associated with capacitor 85 in FIG. 1 may be added for each additional lane, in excess of one lane, allocated for the same directional traffic flow.

With vehicle actuations received from two or more lanes adjustment of tap 100 may be necessary so as to increase the number of vehicles which would provide a 100% volume reading.

Although the presented description and drawings have been presented with the volume of traffic flow being the traffic characteristic measured for each traffic flow and each value of traffic volume, from two traffic flows being compared, one against the other, other traffic characteristics, such as traffic density, i.e. the number of vehicles per unit distance may be determined for each traffic flow and the value of the density of each traffic flow compared, one against the other.

Another traffic characteristic that may be employed in lieu of traffic volume is the average speed of traffic flow. The average speed of two traffic flows may be determined and compared, one against the other, similar to that described relative to the two traffic volumes and that proposed relative to two traffic densities.

If the characteristic of traffic density were to be used in lieu of traffic volume the blocks 61 and 61' in FIG. 3 illustrating and representing volume determining units, would be replaced with traffic density determining units where a charge from a "bucket" capacitor would be applied, upon actuation to a "tank" capacitor, the length of time of the transferred charge being inversely proportional to the speed of the actuating vehicle so that the charge on the "tank" capacitor may be accumulated but with the accumulated charge being progressively discharged or bled-off at a slow, constant rate with the rate of discharge substantially smaller than the individual charge rates. Thus a fast moving vehicle may provide a short pulse from the "bucket" capacitor and a slower moving vehicle may provide a longer pulse from the "bucket" capacitor to the "tank" capacitor. The ratio between the charge and progressive discharge of the "tank" capacitor will balance off at some point of charge on the "tank" capacitor which may be a measure of the instantaneous traffic density of the measured traffic flow.

One form of density determining device may be made by using the volume determining unit of FIG. 3 with the addition of a resistor in series with contact 84 of relay 64, so that when relay 64 is energized and capacitor 85 is connected to capacitor 95 through contact 84 and the added resistor, the amount of the charge transferred depends on the length of closure of contact 84. This density determining unit must be used with a traffic detection means having an output inversely proportional to the moving vehicle speed.

By applying such voltage representing the instantaneous traffic density to an amplifier and the output of the amplifier, which voltage would be proportional to the voltage representing instantaneous traffic density, to a calibration circuit, a voltage may be obtained, which is proportional to, and may be a running measure of the density of the traffic flow taken over a period of time and subject to change as the density of the traffic flow changes but somewhat lagging behind such change of traffic density.

The voltage, which may be the measure of density, may be applied to the circuit of the type illustrated in block 62 of FIG. 3 and into a circuit similar to that found in block 63, with cross connections between the two measuring and determining units, similar to that disclosed in FIG. 3.

If it is desired to use the average speed of the traffic flow for the determined and compared traffic characteristic this may be accomplished by substituting an average speed computer for the traffic volume determining unit in each of the traffic determining and comparing components.

In each of the alternate methods of employing different traffic characteristics from traffic volume, the meter indicating the value of the characteristic measured may be calibrated in convenient terms to give a reading or indication of the value of the traffic characteristic determined.

In each alternate arrangement the timing and offset component may be similar to those presented in FIG. 3a.

Although the present invention has been described in the preferred form, as well as several alternate forms, it will be obvious to those skilled in the art that other arrangements or substitutions of various parts may be made without departing from the spirit of the invention as defined by the claims.

I claim:
1. Traffic control apparatus comprising
    first sensing means, said sensing means providing a first electrical voltage output representing a characteristic of traffic flow of a series of vehicles proceeding along a first traffic path for traffic in one direction, said electrical voltage output substantially continuously varying over a range of values in accordance with said traffic characteristic,
    second sensing means, said second sensing means providing a second electrical voltage output representing a second characteristic of traffic flow of a series of vehicles proceeding along a second traffic path for traffic in a second direction, said second electrical voltage output substantially continuously varying over a range of values in accordance with said second traffic characteristic,
    first output circuit control means,
    second output circuit control means,
    first differential voltage comparator means having two inputs coupled between the outputs of the respective sensing means and having an output coupled to said first output circuit control means for operating said first output control means in response to said first electrical output exceeding said second electrical output by a first predetermined amount of difference, said comparator means including
    means for adjusting said first predetermined amount of difference for said response,
    and a second differential comparator means having two inputs coupled between the outputs of the respective sensing means and having
        an output coupled to said second output circuit control means for operating said second output control means in response to said second electrical output exceeding said first electrical output by a second predetermined amount of difference, said second comparator means including
            means for adjusting said second predetermined amount of difference for said response.

2. Traffic control apparatus as in claim 1 and in which each said differential comparator means includes
    an electron conduction control means having three elements and in which the conduction between the first and second elements is variably controlled by electrical potential of the third element with respect to said second element,
    means for coupling said first electrical output as an input to said third element in said first comparator means and to said second element in said second comparator means,
    and means for coupling said second electrical output as an input to said third element in said second comparator means and to said second element in said first comparator means.

3. Traffic control apparatus as in claim 2 and in which said respective selectron conduction control means comprise
    triodes each having anode, cathode and control grid as said first, second and third elements, and in which said means for coupling said second electrical output to said second element in said first comparator means includes
        a cathode follower having a control grid coupled to said second electrical output and having a cathode coupled to said second element of the electron conduction control means whose third element is coupled to said first electrical output.

4. Traffic control apparatus as in claim 3 and in which each said output circuit control means comprises
    a relay having an operating coil in circuit with said anode of the triode of the comparator means having its output coupled to operate the respective output circuit control means.

5. Traffic control apparatus as in claim 1 and including
    first cycle and offset control circuit means for control of local traffic signal controllers and coupled to said first output circuit control means to be controlled thereby,
    and second cycle and offset control circuit means for control of local traffic signal controllers and coupled to said second output circuit control means to be controlled thereby.

6. Traffic control apparatus as in claim 1 and including
    first cycle timing means for synchronizing control of local traffic signal controllers through a desired time cycle when operated,
    second cycle timing means for synchronizing control of local traffic signal controllers through a second desired time cycle when operated, and means for coupling said first and second timing means to said respective first and second output circuit control means to be operated thereby and including means to operate said first timing means in response to operation of said first circuit control means and means to operate said second timing means in response to operation of said second circuit control means.

7. Traffic control apparatus as in claim 1 and including first electrical output level responsive means coupled to said first electrical output and second electrical output level responsive means coupled to said second electrical output, said level responsive means including third and fourth output circuit control means individual to the respective first and second level responsive means to be controlled thereby, means for operating said third output circuit means in response to said first electrical output exceeding an adjustable predetermined level, and means for operating said fourth output circuit means in response to said second electrical output exceeding an adjustable predetermined level.

8. Traffic control apparatus as in claim 7 and including first, second and third cycle timing means for synchronizing control of local traffic signal controllers through first, second and third desired time cycles, respectively when operated, and selective circuit means for coupling said respective first, second, third and fourth circuit control means to said timing means, said selective circuit means including circuit means for operating said first timing means through its cycle in response to operation of either one of said third and fourth circuit control means concurrently with said first circuit control means without operation of said second circuit control means, circuit means for operating said second timing means through its cycle in response to operation of either one of said third and fourth circuit control means concurrently with said second output circuit control means without operation of said first output circuit control means, and circuit means for operating said third timing means through its cycle in response to operation of either of said third and fourth circuit control means without operation of either of said first and second circuit control means.

9. Traffic control apparatus as in claim 8 and in which said cycle timing means each have a rest position in their cycles and switch means operated in said rest position. and said selective circuit means include interlocking circuit means including said switch means operated by the several cycle timing means in their respective rest positions to transfer from operation of any one said timing means to another of said timing means.

said timing means each including further switch means operated thereby when out of said rest position to maintain operated through its cycle to its rest position any timing means so operated by said selective circuit means.

10. Traffic control apparatus as in claim 1 and in which said means for adjusting said first predetermined difference includes a potentiometer having a resistance coupled between said first voltage output and a reference electrical voltage source and having an adjustable tap on said resistance coupled to one of said inputs of said first comparator means, said potentiometer applying an adjustable part of said first voltage output to said last-named input.

References Cited by the Examiner
UNITED STATES PATENTS

| | | | |
|---|---|---|---|
| 2,542,978 | 2/1951 | Barker | 340—35 |
| 2,750,576 | 6/1956 | Beaubien | 340—37 |
| 2,999,999 | 9/1961 | Bartelink | 340—38 |
| 3,047,838 | 7/1962 | Hendricks | 340—35 |
| 3,075,173 | 1/1963 | Paul | 340—35 |

NEIL C. READ, *Primary Examiner.*

THOMAS B. HABECKER, RUDOLPH V. ROLINEC,
*Examiners.*